Patented Feb. 16, 1943

2,311,065

UNITED STATES PATENT OFFICE 2,311,065

AMINO ANTHRAQUINONES

James G. McNally and Joseph B. Dickey, Rochester, N. Y., assignors to Eastman Kodak Company, Rochester, N. Y., a corporation of New Jersey No Drawing. Application February 28, 1940, Serial No. 321,337

2 Claims. (Cl. 260—371)

This invention relates to anthraquinone compounds. More particularly it relates to anthraquinones containing in at least one alpha position the group having the formula:

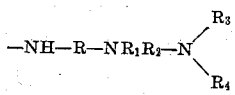

wherein R represents a member selected from the group consisting of an ethylene group when $R_2$ stands for a benzene nucleus, and a sulfonated or non-sulfonated benzene nucleus when $R_2$ stands for an alkylene group or a cycloalkyl group, $R_1$ represents a member selected from the group consisting of hydrogen, and the group

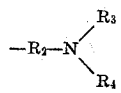

$R_2$ represents a member selected from the group consisting of an alkylene group of at least two carbon atoms, a cycloalkyl group, and a benzene nucleus, and $R_3$ and $R_4$ each represents a member selected from the group consisting of hydrogen, an alkyl group, an alkoxyalkyl group, a hydroxyalkyl group, a sulfatoalkyl group, a phosphitoalkyl group, a phosphatoalkyl group, and an aminophenyl group. More specifically, $R_2$ may be an ethylene group, a propylene group, a butylene group, a cyclohexyl group, a cyclopentyl group, or a benzene nucleus which may be sulfonated as desired, and $R_3$ and $R_4$ besides being hydrogen, may also be a methyl group, an ethyl group, a butyl group, a methoxymethylamino group, a methoxyethylamino group, a methoxypropylamino group, a ethoxyethylamino group, a butoxyethylamino group, a $\beta$-hydroxyethylamino group, a $\beta$-hydroxypropylamino group, a $\gamma$-hydroxypropylamino group, a glycerylamino group, the sulphuric acid, phosphoric acid and phosphorous acid esters of the above hydroxyalkylamino groups, and an aminophenyl group which may be sulfonated.

The anthraquinone nuclei in addition to containing one or more of the above described polyamino groups may also contain in the remaining alpha positions one or more other monovalent substituents selected from the group including a hydroxyl group, an amino group, an alkylamino group such as methylamino, ethylamino, propylamino, cetylamino, allylamino, furylamino, thiofurylamino, thiazylamino, an aminocarbazole, a hydroxyalkylamino or alkoxyalkylamino group of the type mentioned above, a cycloalkylamino group such as a cyclohexylamino group, a morpholino group, a pyridino group, and a phenylamino group which may be sulfonated as desired.

We have found that the anthraquinone compounds of our invention constitute a series of valuable dyestuffs for coloring cellulose esters, silk and wool, and more particularly cellulose acetate. The colors produced on these materials range from greenish-blue to violet shades and show excellent fastness to light and atmospheric conditions. Furthermore, our dyes may be applied smoothly and with considerable rapidity, as compared with other anthraquinones employed heretofore, due largely to their more basic character.

The object of our invention is 1,4 aminoanthraquinone compounds.

The anthraquinone compounds of the invention may be prepared by condensing one or more equivalents of an organic polyamine of the type:

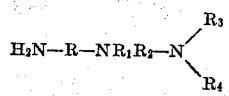

wherein R, $R_1$, $R_2$, $R_3$ and $R_4$ have the meanings already defined, with an anthraquinone compound substituted in one or more of its alpha positions with a substituent such as hydroxyl, halogen, amino, methoxy, and the like, which is capable of being replaced by an organic amine. The reaction will ordinarily be performed under reflux conditions in a medium of ethanol, butanol or pyridine. A variation for the preparation of the dyes of the invention consists of condensing the above kind of anthraquinones with a mixture of two organic amines, one of which corresponds to the above formula, while the other may be a simpler type of organic amine such as methylamine, ethanolamine, and the like. The above reaction with two different amines may also be accomplished in a stepwise manner. In the particular case where a mixture of a polyamine and a glycerylamine is employed, a catalyst of boric acid facilitates the condensation reaction.

The polyamine intermediates employed in our invention may be prepared by a number of methods. For example, p-aminophenyl ethylene diamine may be prepared by condensing a para-halo-nitrobenzene with ethylene diamine, and reducing the product thus obtained either catalytically with nickel and hydrogen, or chemically with metallic zinc and a mineral acid. If the p-aminophenyl ethylene diamine thus obtained is treated with ethylene oxide in an autoclave at an elevated temperature, there is obtained the hydroxyethyl derivative, that is, 1-amino-4-$\beta$-($\beta'$ - hydroxyethylamino - )-ethylaminobenzene. The sulphuric acid esters may be obtained by treatment of the latter compound with fuming sulphuric acid, and the phosphorus acid esters by treatment with phosphorus oxychloride, phenoxyphosphoryl chloride, and similar kind of esterifying compounds. The above process may be employed equally well for the preparation of the isomeric ortho and meta derivatives. In place of ethylene diamine, there may be substituted various alkyl derivatives including 1-amino-2-methylamino-ethane, 1 - amino - 2 - dimethylaminoethane, 1-amino-2-β-hydroxyethylamino - ethane, and the like, as well as other alkylene polyamines of a similar nature.

Another method of preparing the polyamine intermediates is to condense a halobenzene with an alkylene polyamine, couple the product with a diazonium benzene compound, and then split the azo group by chemical or catalytic reduction to the desired free amine. Further, instead of coupling the above phenylalklene polyamine compound with a diazonium salt, it may simply be treated with nitric acid, and the nitro group then reduced to the corresponding amino compound.

The following examples further illustrate the anthraquinone compounds of our invention.

*Example 1*

A mixture of 1 mole of leucoquinizarin and 1 mole of p-aminophenyl ethylene diamine is heated together under reflux for 4 hours in 2000 ccs. of butanol. The reaction mixture is poured into a large excess of water, oxidized with sodium perborate, and the precipitated dye filtered off, washed and dried. Cellulose acetate is colored purple from an aqueous suspension of the dye. The anthraquinone obtained has the formula:

If 2 moles of p-aminophenyl ethylene diamine or mixtures of 1 mole of the said amine with 1 mole of an alkylamine such as methylamine, ethylamine, ethanolamine, and the like, are used, there is obtained the corresponding di-substituted derivatives. In place of leucoquinizarin, there may be substituted leuco-1,4,5-trihydroxyanthraquinone, and leuco-1,4,5,8-tetrahydroxyanthraquinone.

*Example 2*

1 mole of 1-bromo-4-morpholino-anthraquinone is heated with 2 moles of p-aminophenyl ethylenediamine and 10 grams of copper powder in pyridine at 180–200° C. for 20 hours. The pyridine is then distilled off, and the dye product obtained colors cellulose acetate blue shades from an aqueous suspension of the dye. In place of 1-bromo-4-morpholino-anthraquinone, there may be substituted 1-nitro-4-morpholino-anthraquinone, 1-methoxy-4-morpholino - anthraquinone, and 1-ethoxy-4-morpholino-anthraquinone.

*Example 3*

A mixture of equivalent molecular proportions of leucoquinizarin, tetrahydrofurfurylamine and 1 - amino-4-β-(β'-aminoethylamino-) - ethylaminobenzene is heated under reflux for 4 hours in 2000 ccs. of butanol. The dye is purified in the manner described in Example 1. Cellulose acetate is colored blue shades from an aqueous suspension of the dye. The compound obtained has the formula:

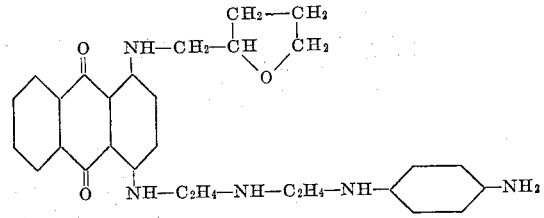

In place of tetrahydrofurfurylamine, there may be substituted 3-aminopyridine, 2-aminopyridine, 3-aminofuran, 2-aminothiophene, 2-aminothiazole, while in place of 1-amino-4-β-(β'-aminoethylamino-) -ethylaminobenzene, there may be substituted 1-amino-3-chloro-4-β-(γ-aminopropylamino-) -ethylaminobenzene, and p-aminophenyl ethylene diamine. Similar dyestuffs are obtained by replacing leucoquinizarin with leuco-1,4,5-triaminoanthraquinone, leuco-1,4,5,8-tetrahydroxyanthraquinone, and leuco-5-methylamino-1,4-dihydroxyanthraquinone.

*Example 4*

1 mole of leuco-1,4,5,8-tetrahydroxy anthraquinone is heated together with 2 moles of methylamine, 1 mole of p-aminophenyl ethylenediamine, and 162 grams of sodium hydrosulfite in 600 grams of water in an autoclave at 110–120° C. for 8 hours. The leuco compound obtained is oxidized with sodium perborate to the dye product having the formula:

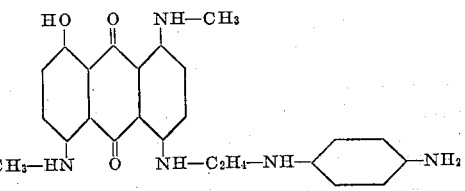

which colors cellulose acetate blue-green shades from an aqueous suspension of the dye. Similar dyestuffs are obtained by employing, instead of methylamine other alkylamines, as for example ethylamine, propylamine, butylamine, ethanolamine, propanolamine, and the like.

*Example 5*

1 mole of leuco-1,4,5,8-tetrahydroxy anthraquinone is heated in an autoclave with 1 mole of 1-amino-2-methoxy-4-(ω-acetaminopropyl-)-aminobenzene in 3000 ccs. of ethanol at 95° C. After 10 hours treatment, the mixture is withdrawn from the autoclave, 1 mole of methylamine and 80 grams of boric acid added, and heating under reflux in the air continued until no further color change takes place. The reaction mixture is then poured into an excess of water, oxidized with sodium perborate, and the precipitated dye filtered off, washed and dried. The compound obtained has the formula:

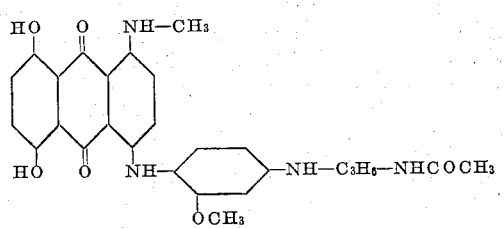

If the above compound is treated with a mineral acid such as hydrochloric or sulphuric acid, the acetyl group is split off, and the free amine thus formed colors cellulose acetate bluish-green shades from an aqueous suspension of the dye. In place of a mixture of methylamine and 1-amino-2-methoxy-4-(ω-acetaminopropyl-)-aminobenzene, other mixtures of organic amines may be employed, as for example methylamine, ethylamine, butylamine, ethanolamine, propanolamine, or allylamine with 1-amino-2-methoxy-4-(ω-acetaminopropyl-)-aminobenzene, 1-amino-2-methoxy-4-(β-acetaminoethyl-)-aminobenzene, or 1-amino-2-methoxy-4-(ω-acetaminobutyl-)-aminobenzene. Similar dyestuffs are obtained by replacing leuco-1,4,5,8-tetrahydroxyanthraquinone with leuco-1,3,5-trihydroxyanthraquinone, and leuco-1,4-diaminoanthraquinone.

*Example 6*

A mixture of equivalent molecular proportions of leuco-1,4-diamino-5,8-dihydroxyanthraquinone, ethanolamine, and 1-amino-3-methyl-4-(di-ω-dimethylaminopropyl)-aminobenzene is heated under reflux in 2000 ccs. of butanol for a period of 10 hours. The reaction mixture is precipitated in water, oxidized with sodium perborate, and the resulting dye is filtered off, washed and dried. Cellulose acetate is colored blue-green shades from an aqueous suspension of the dye. The compound has the formula:

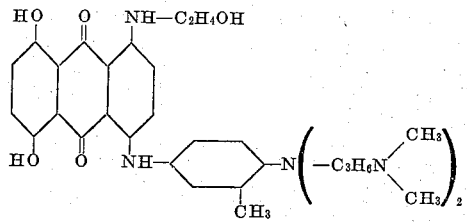

In place of the ethanolamine, there may be substituted beta- or gamma-propanolamine, glycerylamine, butanolamine, cyclohexanolamine, and in place of the 1-amino-3-methyl-4-(di-ω-di-methylaminopropyl-)-aminobenzene there may be substituted 1-amino-3-methyl-4-(di-ω-diethylaminopropyl-)-aminobenzene, 1-amino-2-methoxy-5-methyl-4-(di-ω-dibutylaminoethyl-)-aminobenzene, 1-amino-3-methyl-4-[di-ω-(β'-methoxyethylamino-)-propyl-]-aminobenzene, and 1-amino-3-methyl-4-[di-ω-(β'-butoxyethylamino-)-propyl-]-aminobenzene. Similar dyestuffs are obtained by employing, instead of leuco-1,4-diamino-5,8-dihydroxyanthraquinone, other anthraquinone compounds such as leuco-1,4-diaminoanthraquinone and leuco-1,4,5,8-tetraamino anthraquinone

*Example 7*

A mixture of equal molecular quantities of leucoquinizarin and 1-amino-4-β-(β'-hydroxyethylamino-)-ethylaminobenzene is heated under reflux in 2000 ccs. of butanol for a period of 6 hours. The dye is precipitated from the reaction mixture in the manner described in Example 1. Cellulose acetate is colored violet shades from an aqueous suspension of the dye. The compound has the formula:

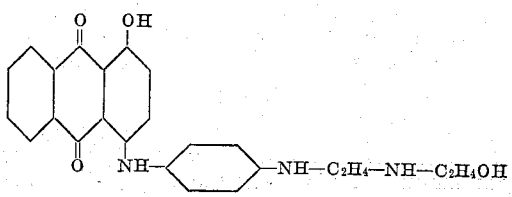

If 2 moles of 1-amino-4-β-(β'-hydroxyethylamino-)-ethylaminobenzene are used, there is obtained the corresponding di-substituted derivative. In place of leucoquinizarin, there may be substituted leuco-1,3,5-trihydroxyanthraquinone, and leuco-1,4,5,8-tetrahydroxyanthraquinone.

*Example 8*

A mixture of equal molecular proportions of leucoquinizarin, methylamine, and 1-amino-4-β-(β'-hydroxyethylamino-)-ethylaminobenzene is heated under reflux in 1500 ccs. in butanol for 4 hours. The reaction mixture is poured into an excess of water, oxidized with sodium perborate, and the dye precipitate thus obtained is filtered off, washed and dried. Cellulose acetate is colored bluish-green shades from an aqueous suspension of the dye. The compound has the formula:

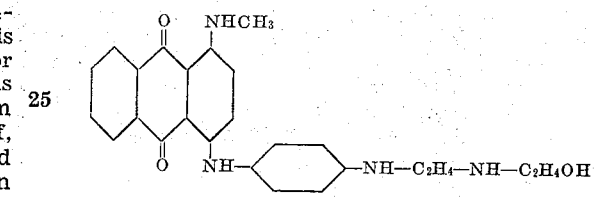

In place of methylamine there may be substituted other alkylamines, as for example, ethylamine, propylamine, isobutylamine, n-butylamine, cetylamine, allylamine, and heterocyclic amines such as furfurylamine, 2-aminopyridine, 3-aminopyridine, 3-aminofuran, 2-aminothiophene, 2-aminothiazole, or an aminocarbazole. Similarly, in place of 1-amino-4-β-(β'-hydroxyethylamino-)-ethylaminobenzene, there may be substituted 1-amino-4-β-(γ-hydroxypropylamino-)-ethylaminobenzene, 1-amino-4-β-(N-β'-hydroxyethyl-γ'-hydroxypropylamino-)-ethylaminobenzene, 1-amino-3-methyl-4-[di-ω-(β'-hydroxyethylamino-)-propyl-]-aminobenzene, 1-amino-2-methoxy-4-(4'-glycerylaminophenyl-)-aminobenzene, 1-amino-3-methoxy-4-para-(β-hydroxyethylamino-)-cyclohexylaminobenzene, 1-amino-4-(γ-methylamino-β-hydroxypropyl-)-aminobenzene, and 1-amino-4-ω-(β'-hydroxyethylamino-)-propyl methylamino benzene. Likewise, in place of leucoquinizarin there may be employed leuco-1,4,5-trihydroxyanthraquinone, leuco-1,4,5,8-tetrahydroxyanthraquinone, and leuco-1,4,5-trihydroxy-8-aminoanthraquinone.

The dye compound represented by the above structural formula may also be prepared by a different process. In this case, the starting material may be, for example, 1-methylamino-4-β-amino ethyl-p-phenylene diamino-anthraquinone, which is treated with an alkylene oxide such as ethylene oxide in a solvent medium of dioxane in an autoclave at 110–120° C., for a period of about 10 hours. In place of ethylene oxide there may be substituted propylene oxide, trimethylene oxide, epichlorhydrin, glycidol, and cyclohexane oxide.

*Example 9*

0.2 mole of leuco-1,4,5-trihydroxy anthraquinone, 0.8 mole of 1,4,5-trihydroxyanthraquinone, 1 mole of ethanolamine, and 1 mole of 1-amino-4-β-(β' or γ'-hydroxypropylamino-)-ethylaminobenzene are heated together under reflux in 3000 ccs. of pyridine for a period of 6 hours. The 1 - β - hydroxyethylamino - 4 - [4'- β - (β' or γ'- hydroxypropylamino - ) - ethylamino - ] - phenylamino anthraquinone thus obtained colors cellulose acetate greenish-blue shades from an aqueous suspension of the dye. Similar dyestuffs are obtained by replacing the ethanolamine with an equivalent quantity of beta- or gamma-propanolamine, glycerylamine, cyclohexylamine, and the like.

*Example 10*

A mixture of equal molecular proportions of leuco - 1,4,5,8 - tetraaminoanthraquinone, allylamine, and 1-amino-3-β-(N-β'-hydroxyethyl-γ''-hydroxypropylamino - ) - ethylaminobenzene is heated under reflux in 2000 ccs. of pyridine for a period of 6 hours. The reaction mixture is oxidized with air and the dye crystallized from solution by concentrating the pyridine solution. Cellulose acetate is colored bluish-green shades from an aqueous suspension of the dye. In place of allylamine, there may be employed alpha-, beta-, or gamma-methylallylamine, beta-phenylallylamine, and other similar kind of unsaturated organic amines. Likewise, the m-phenylene polyamine derivative may be substituted by the corresponding ortho- and para- derivatives.

*Example 11*

A mixture of equal molecular proportions of leuco-1,4,5,8-tetrahydroxyanthraquinone, cyclohexylamine, and 1-amino-2-methoxy-4-(4'-glycerylaminophenyl-)-aminobenzene together with a quantity of boric acid as a catalyst, is heated under reflux in ethanol for a period of about 24 hours. The reaction mixture is oxidized with sodium chlorate and the dye recovered as described in Example 1. It is also possible to obtain the same compound without the use of the boric acid catalyst, but in that case, it is necessary to conduct the reaction in a stepwise manner. Cellulose acetate is colored bluish-green shades from an aqueous suspension of the dye. In place of cyclohexylamine, there may be substituted, cyclopentylamine, or camphorylamine.

*Example 12*

A mixture of equal molecular proportions of 1,5-dimethoxy-4,8-diaminoanthraquinone, 3-aminofuran, and 1-amino-3-methoxy-4-para-(β-hydroxyethylamino - ) - cyclohexylaminobenzene is refluxed in 3000 ccs. of ethanol until no further color change takes place. The reaction mixture is then cooled, and the crystallized dye is filtered off, washed and dried. The 1-[3'-methoxy-4'-(β-hydroxyethylamino-para-cyclohexylamino -)-phenylamino-]-5-(3'-furylamino-)-4,8-diaminoanthraquinone thus obtained colors cellulose acetate blue-green shades from an aqueous suspension of the dye. Instead of 3-aminofuran, there may be employed 3-amino tetrahydrofuran, 2-aminthiophene, 2-aminopyridine, and similar kind of heterocyclic amines.

*Example 13*

1 mole of 1,5-diamino-4-methylamino-8-ethylamino anthraquinone is heated with approximately 5 moles of 1-amino-4-(γ-methylamino-β-hydroxypropyl-)-aminobenzene in a solvent medium of pyridine. The reaction mixture is cooled, and the precipitated dye is filtered off, washed and dried. Cellulose acetate is colored blue-green shades from an aqueous suspension of the dye.

*Example 14*

1 mole of 1-nitro-4-β-hydroxyethyl ethylenediamino-5,8-dihydroxy anthraquinone is heated with 1 mole of 1-amino-2-γ-(β'-hydroxyethyl-ethylene diamino-)-propylaminobenzene in 5000 ccs. of pyridine until no further color change takes place. The solution is concentrated and the dye allowed to crystallize. The 1-(-NH-C₆H₄-NH-C₃H₆-NH-C₂H₄-NH-C₂H₄OH) - 4-(-NH-C₂H₄-NH-C₂H₄OH)-5,8-dihydroxy anthraquinone thus obtained colors cellulose acetate bluish-green from an aqueous suspension of the dye.

*Example 15*

1 mole of 1-(4'-β-aminoethylamino-) phenylamino - 4 - methylamino - 5 - ethylamino - 8 - hydroxyanthraquinone is dissolved in dioxane and heated with approximately 6 moles of ethylene oxide in an autoclave at 100–200° C., for a period of 5–10 hours. The dye product is obtained by evaporation of the dioxane. The 1-(NH-C₆H₄-NH-C₂H₄-NH-C₂H₄OH) - 4 - methylamino-5-ethylamino-8-hydroxyanthraquinone thus obtained colors cellulose acetate blue-green shades from an aqueous suspension of the dye. In place of ethylene oxide, there may be employed beta- or gamma-propylene oxide, glycidol, epichlorohydrin, and cyclohexane oxide.

*Example 16*

A mixture of equal molecular proportions of 1-amino-4-methoxy anthraquinone, 1-amino-4-(β-aminoethyl-)-aminobenzene, and 1-amino-4-(β-acetaminoethyl-)-aminobenzene is warmed in methanol until no further color change takes place. When the reaction is complete, the solution is concentrated by evaporation and the dye allowed to crystallize from the concentrate. The product thus obtained consists of a mixture of two individual compounds, 1-amino-4-(-NH-C₂H₄-NHC₆H₄NH₂)-anthraquinone and

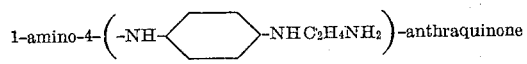

and colors cellulose acetate blue shades from an aqueous suspension of the product.

*Example 17*

1 mole of the dye prepared in Example 9 is dissolved in pyridine and 1 mole of phosphorus oxychloride slowly added at 10° C. The reaction is completed by warming the mixture to 50–60° C., after which there is added a cold aqueous solution of sodium carbonate. The pyridine is then removed by distillation under reduced pressure, and the residue dissolved in water, salted out, filtered off and dried. The dye has the formula:

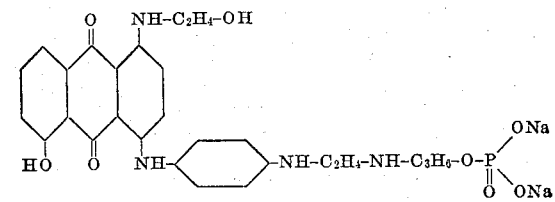

and colors silk and wool greenish-blue shades from an aqueous solution which may contain salt.

*Example 18*

1 mole of the dye prepared in Example 8 from leuco-1,4,5,8-tetrahydroxy anthraquinone, methylamine, and 1 - amino-4-β-(β'-hydroxyethylamino-)-ethylaminobenzene is treated with two moles of 10% fuming sulphuric acid at 20° C., until a drop of the mixture added into a dilute sodium hydroxide solution dissolves completely. The reaction mixture is then poured on ice, neutralized with sodium carbonate using Congo red paper as an indicator, and the dye salted out, filtered and dried. The dye has the formula:

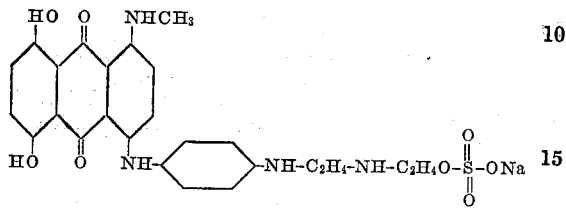

and colors cellulose esters, silk and wool bluish-green shades from an aqueous solution or suspension of the dye which may contain salt.

*Example 19*

1 mole of the dye product prepared in Example 4 from leuco-1,4,5,8-tetrahydroxy anthraquinone, methylamine, and p-aminophenyl ethylenediamine is dissolved in 2 moles of 10% oleum and the mixture warmed until a drop added into a dilute sodium hydroxide solution dissolves completely. The reaction mixture is then poured on ice, neutralized with sodium carbonate using Congo red paper as an indicator, and the dye salted out, filtered and dried. The dye compound thus obtained has the formula:

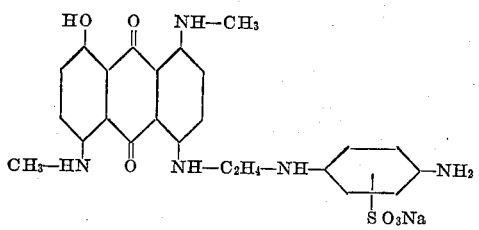

and colors silk and wool green-blue shades from an aqueous solution of the dye which may contain salt.

*Example 20*

1 mole of the dye product of Example 5 is sulfonated following the procedure of Example 19. The dye compound thus obtained has the formula:

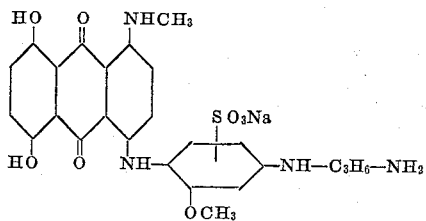

and colors silk and wool blue-green shades from an aqueous solution of the dye which may contain.

*Example 21*

1 mole of the dye product of Example 8 is dissolved in pyridine and 1.1 moles of phenoxyphosphoryl chloride is added at 10° C. The reaction is completed by warming the mixture to 50–60° C., after which there is added a cold aqueous solution of sodium carbonate. The pyridine is then removed by distillation under reduced pressure, the residue dissolved in water, salted out, filtered off and dried. The dye has the formula:

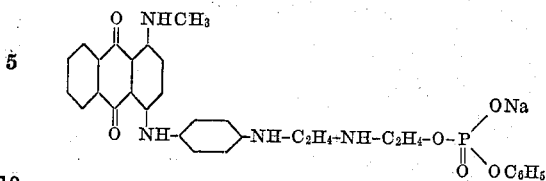

and colors cellulose acetate, silk and wool greenish-blue shades from an aqueous solution or suspension of the dye which may contain salt.

*Example 22*

1 mole of the dye product made by the process of Example 8 from leucoquinizarin, methylamine, and 1-amino-4-β-(β'-hydroxyethylamino-)-ethylaminobenzene is dissolved in pyridine and reacted with 1 mole of phosphorous trichloride following the general procedure of Example 21. The dye compound thus obtained has the formula:

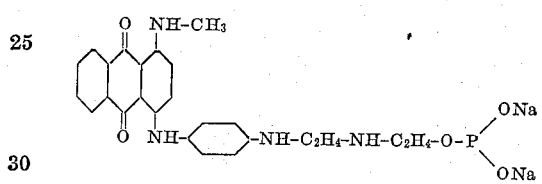

and colors Nylon, cellulose acetate, wool and silk greenish-blue shades from an aqueous solution of the dye which may contain salt.

In the application of the anthraquinone compounds of our invention to the coloration of organic derivatives of cellulose, silk and wool, the dye compound will ordinarily be applied in the form of an aqueous suspension, which may be prepared by grinding the dye to a paste with a dispersing agent such as a soap, a sulfonated oil, or a higher fatty acid glyceryl sulfate, and then dispersing the paste in warm water. The material to be colored is immersed in this dispersion starting with a bath temperature of approximately 45–55° C., which is gradually increased to 80–85° C., at which point it is maintained for several hours. Sodium chloride may be added to facilitate the exhaustion of the dye bath during the dyeing operation. When the material has acquired the desired shade or condition of color, it is removed from the bath, washed with soap, rinsed and dried. In the case where the particular dye compound is water-soluble, as with many of the sulfonated and phosphated derivatives, the dye may be applied in known manner directly from an aqueous solution of the dye containing salt, without the necessity of employing a dispersing or solubilizing agent.

While our invention is illustrated more particularly in connection with cellulose acetate, a material to which the invention is especially adapted, it will be understood that the anthraquinone dye compounds above described are not limited exclusively to cellulose acetate, but are likewise applicable for coloring organic derivatives of cellulose in general, including both the hydrolyzed and the unhydrolyzed varieties of organic acid esters of cellulose such as cellulose formate, cellulose propionate, cellulose butyrate, cellulose stearate, cellulose phthalate, cellulose acetate-propionate, cellulose acetate-butyrate, cellulose ethers such as methyl cellulose, ethyl cellulose, benzyl cellulose, as well as for silk and wool in particular cases.

We claim:
1. The non-sulfonated anthraquinone compounds having the general formula:
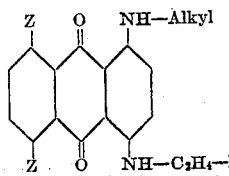
wherein each Z represents a member selected from the group consisting of hydrogen, a hydroxyl group, an amino group, and an alkyl- amino group, and $R_2$ represents a benzene nucleus.
2. The anthraquinone compound having the formula:
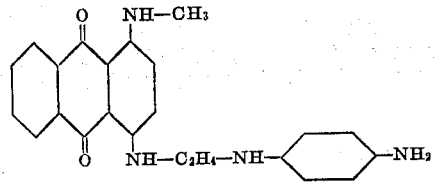
JAMES G. McNALLY.
JOSEPH B. DICKEY.